(12) United States Patent
Martensson

(10) Patent No.: US 8,128,284 B2
(45) Date of Patent: Mar. 6, 2012

(54) TRANSMITTER AND METHOD FOR PRODUCING A TRANSMITTER

(75) Inventor: Hans-Owe Martensson, Malmo (SE)

(73) Assignee: Inor Process AB, Malmo (SE)

( * ) Notice: Subject to any disclaimer, the term of this patent is extended or adjusted under 35 U.S.C. 154(b) by 664 days.

(21) Appl. No.: 12/271,404

(22) Filed: Nov. 14, 2008

(65) Prior Publication Data
US 2009/0124220 A1    May 14, 2009

(51) Int. Cl.
*G01D 11/30* (2006.01)
*G01K 1/00* (2006.01)
(52) U.S. Cl. ........................................ 374/208
(58) Field of Classification Search ............ 374/208
See application file for complete search history.

(56) References Cited

U.S. PATENT DOCUMENTS

| | | | |
|---|---|---|---|
| 3,188,776 A | 6/1965 | Dill | |
| 4,272,146 A * | 6/1981 | Simon et al. | 439/404 |
| 5,231,659 A * | 7/1993 | Abraham et al. | 379/433.03 |
| 5,243,306 A * | 9/1993 | Minowa et al. | 333/135 |
| 5,463,375 A * | 10/1995 | Bauer | 340/517 |
| 5,498,079 A * | 3/1996 | Price | 374/208 |
| 5,546,804 A * | 8/1996 | Johnson et al. | 73/431 |
| 5,585,577 A * | 12/1996 | Lemoine et al. | 73/866.5 |
| 5,669,713 A * | 9/1997 | Schwartz et al. | 374/1 |
| 6,062,095 A * | 5/2000 | Mulrooney et al. | 73/866.5 |
| 6,148,681 A * | 11/2000 | Gravel et al. | 73/866.5 |
| 2005/0079833 A1 | 4/2005 | Bauschke et al. | |
| 2005/0172738 A1* | 8/2005 | Broden | 73/866.5 |
| 2006/0132126 A1 | 6/2006 | Braun et al. | |

FOREIGN PATENT DOCUMENTS

WO    WO 2006/063884    6/2006

* cited by examiner

*Primary Examiner* — Christopher Fulton
(74) *Attorney, Agent, or Firm* — Cesari and McKenna, LLP; John F. McKenna

(57) ABSTRACT

A transmitter, in particular for mounting on the head of a process thermometer, has an upper part, a lower part, at least one connection unit and at least one electric contact element. The connection unit is arranged on the inside of the upper part and can be electrically contacted via the contact element from the outside of the upper part. The lower part is integrally formed using thermoplastic plastic and the upper part and the lower part are force-fit and/or form-fit with one another. A method for making the transmitter is also disclosed.

8 Claims, 5 Drawing Sheets

TRANSMITTER AND METHOD FOR PRODUCING A TRANSMITTER

BACKGROUND OF THE INVENTION

1. Field of the Invention

The invention relates to a transmitter, in particular for mounting on the head of a process thermometer, having an upper part, a lower part, at least one connection unit and at least one electric contact element, wherein the connection unit is arranged on the inside of the upper part and can be electrically contacted via the contact element from the outside of the upper part. The invention relates further to a method for producing such a transmitter, wherein the electric connection element is arranged on the inside of the upper part and the contact element is arranged on or in the upper part so that the connection unit is electrically contacted via the contact element.

Transmitters of the type mentioned above have been known for a long time, in particular in the field of process measurement technology, here, particularly, for temperature measurement, wherein the field of application of transmitters is not limited to temperature measurement. In general, transmitters have the task of converting a sensor signal into a standardized signal regardless of whether it is a sensor signal from a thermal element, a capacitive or inductive sensor or, for example, the "signal" from a resistance strain gauge (value of resistance) and of providing it to the higher-ranking process control. In the following, the application and use of a transmitter is described using the example of a process thermometer, wherein it is to be asserted that a transmitter is, naturally, not limited to this application.

2. The Prior Art

A transmitter of the type in question is normally arranged in a connecting head, which protects the transmitter from environmental influences and represents a safe assembly alternative for the transmitter. Using wiring, the transmitter is connected to the actual sensor element in the connecting head. In the case of temperature measurement, the thermal sensor element (temperature-dependent resistance or thermal element) is arranged in a thermowell that comes into contact with the actual process and the sensor element is further connected to the connecting head via a process connection and a neck pipe. The sensor element converting the actual physical parameter of interest into an analyzable parameter is normally electroconductively connected to the transmitter via one or multiple contact elements, wherein the contact elements are electrically connected to the connection unit of the transmitter.

Transmitters of like kind consist of an upper part and a lower part, wherein the upper part and the lower part form a hollow space in which the connection unit is found in the assembled state of the transmitter. The hollow space is then, normally, filled with silicone or a compound containing silicone that surrounds and protects the connection unit. A disadvantage of this arrangement is that the transmitter consists of relatively many parts and the production of such a transmitter takes a very long time —due to its construction and the materials used. A significant reason for this is that the silicone used is often of two components and, after the mixing step, the workable silicone compound needs to first be vacuum treated to remove enclosed air bubbles. Furthermore, the silicone used has to be set using a very complex heat treatment process.

SUMMARY OF THE INVENTION

Thus, the object of the invention is to provide a transmitter and a method for producing a transmitter in which the disadvantages mentioned above can be—at least partially—avoided.

The transmitter according to the invention in which the object derived and shown above is met, is first and essentially characterized in that the lower part is integrally formed using thermoplastic plastic and the upper part and the lower part are force-fit and/or form-fit with one another. Using an embodiment of the transmitter according to the invention, a separate, saucer-type lower part can be dispensed of, since the lower part formed of thermoplastic plastic performs the function of both the known casting compound from the prior art and the saucer-type lower part.

In particularly advantageous embodiments of the invention, the lower part essentially encloses the connection unit arranged in the upper part, which is advantageous in many respects. On the one hand, it is achieved thereby that the connection unit is mechanically and electrically protected from environmental influences, wherein in particular possible relative movement from vibrations between the upper part and the connection unit are reduced, which is advantageous to the expected running life. On the other hand, the connection unit is protected against moisture and irregular thermal exposure by the lower part that surrounds it. A further advantage of the complete enclosure of the connection unit by the thermoplastic plastic is that, due to a practically indissoluble form fit with the connection unit, the connection unit affixed on the upper part is also simultaneously connected to the upper part. When it is said that the connection unit is "essentially" surrounded by the lower part, then it is meant that, in order to achieve the effect mentioned above, it is often not important that in a narrow literal sense that a complete enclosure of the connection unit exists.

In a further advantageous embodiment of the invention, the thermoplastic plastic is a material from the polyamides group or, respectively includes a material from the polyamides group. That group of materials is particularly suitable for the application discussed here, since the electric conductivity is extremely low, namely in the range of $10^{-12}$ $m^{-1}\Omega^{-1}$ while having good mechanic elasticity. In particular, such polyamides are preferred that have a glass transition temperature in the range of 60° to 75° C., preferably a glass transition temperature in the range of more than 70° C.

The transmitter according to the invention is particularly sturdy when the lower part fits essentially completely against the inside of the upper part, so that the upper part and the lower part of the transmitter can completely support one another, which benefits, in particular, also the long-term functionability of the electric connection between the contact elements and the connection unit.

According to a further advantageous embodiment of the invention, projections are formed in the upper part and there are corresponding projections in the lower part, wherein the projections of the upper part and the projections of the lower part can support one another in the assembled state of the transmitter, so that the upper part and the lower part are latched to one another.

The above derived and depicted object is met according to a further teaching of the invention in the above-mentioned method for producing a transmitter in that the upper part is arranged in a form with the connection unit, a thermoplastic plastic is heated to working temperature and the lower part is integrally formed by casting or injection-molding of the thermoplastic plastic in the form and on the inside of the upper part, so that the lower part and the upper part are connected to one another using force fitting and/or form fitting.

Compared with the known method, the method according to the invention has, inter alia, the considerable advantage that it can do without the processing of a separate, saucer-shaped lower part.

The method is then particularly advantageous when a material from the polyamides group or, respectively, a material that contains a polyamide is chosen as thermoplastic plastic. Compared with the known application of, in particular, two component silicones, both a step in the method to release gas from the compound in a vacuum and the setting step in a heat chamber are omitted. The expenditure of time for carrying out the method according to the invention is only a fraction of that with the use of silicone. In an advantageous embodiment of the method, the casting or molding step is carried out in less than 30 seconds, preferably even in 20 seconds. The transmitter produced in this manner can be taken out of the form and even calibrated after a very short phase for cooling-down. The savings in time compared to the conventional method is sizeable, so that transmitters produced with the method according to the invention can be produced considerably more economically.

In detail, there are multiple possibilities to design and further develop the transmitter according to the invention and the method according to the invention. Please refer to the dependent claims and to the description of preferred embodiments in connection with the drawings.

DESCRIPTION OF PREFERRED EMBODIMENTS

Figure 1:
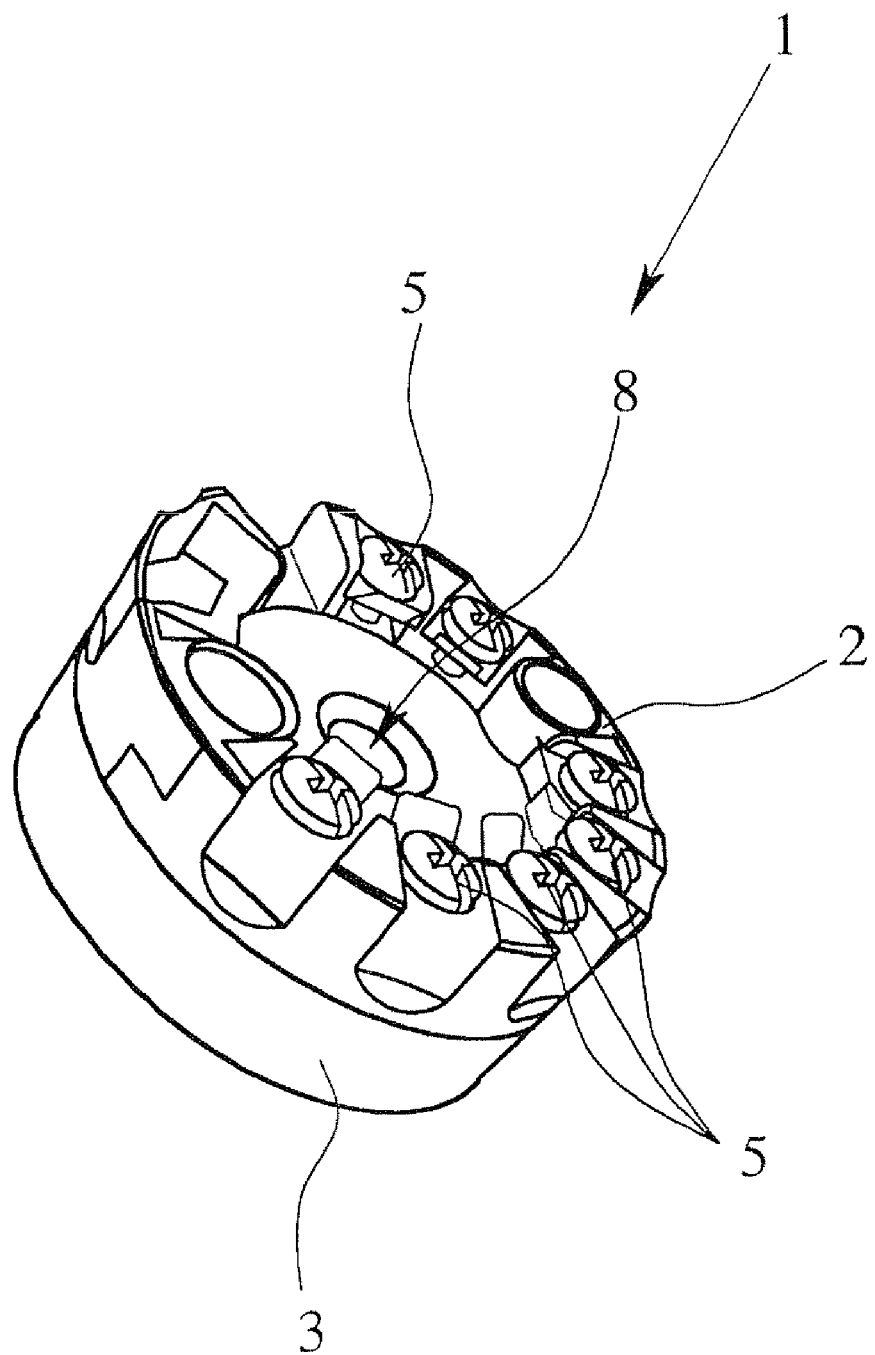
FIG. 1 is a perspective view from above of a transmitter according to the invention.
Figure 2:
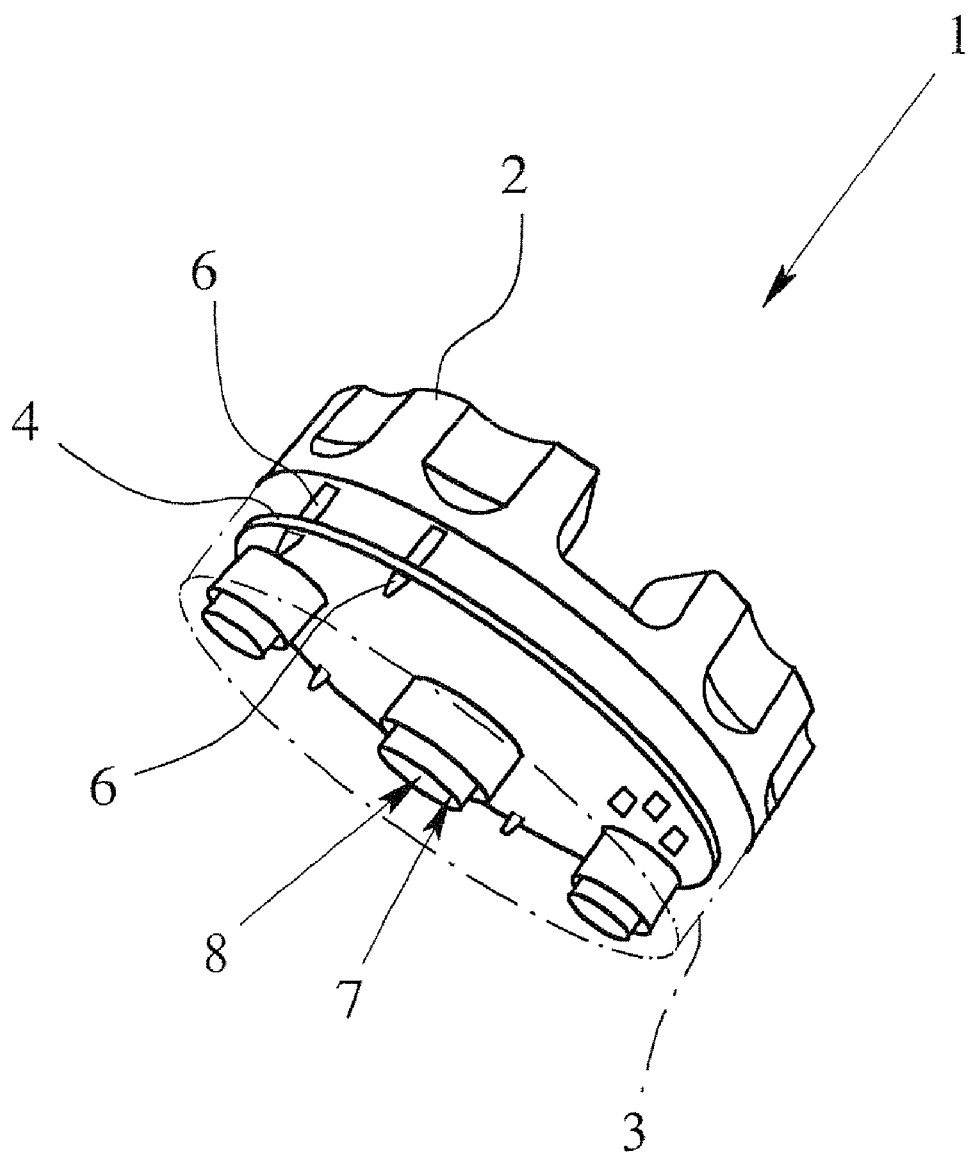
FIG. 2 is a perspective view from below of a transmitter according to the invention.

A pre-assembled or, respectively produced transmitter 1 is shown in each of FIGS. 1, 2, 5 and 7, wherein especially for FIGS. 3 to 7, it is a given that the representations are extremely simplified and schematic. For all of the transmitters 1 shown in FIGS. 1 to 7, the transmitters 1 are process thermometers that are provided for mounting on the head and, with their dimensions, fit into connecting heads with dimensions of the DIN form B. The transmitters 1 have an upper part 2, a lower part 3, at least one connection unit 4 and an electric contact element 5. The connection unit 4 is, as can be seen in FIGS. 2, 4, 5 and 7, arranged on the inside of the upper part 2 and can be electrically contacted via the contact element 5 from the outside of the upper part 2. The contact elements actuated from the outside of the upper part 2 extend with contact pins 6 though the upper part 2 up to the inside of the upper part 2, where it electrically contacts the connection unit 4. The contact pins shown in FIGS. 2 to 7 are connected in the process by soldering with a conductor of the connection unit. Only a printed circuit board is shown from the connection unit 4; conductors and possible wired components are not shown.

The transmitters shown in FIGS. 1, 2, 5 and 7 are distinguished in that their lower part 3 is integrally formed by thermoplastic plastic and the lower part 3 and the upper part 2 are force-fit and/or form-fit with one another. Form-fitting is achieved in that, in production, (semi)liquefied thermoplastic plastic forms around elements of the upper part 2, which are formed on the inside of the upper part 2. When the inside of the upper part 2 is mentioned, then the side is meant that is found inside of the transmitter 1 in the joined state of the transmitter 1.

In the embodiments according to FIGS. 1, 2, 5 and 7, the lower part encloses the connection unit 4 arranged in the upper part 3. For this reason, on the one hand, the connection unit 4 is protected against external influences; on the other hand, the cohesion of the upper part 2 and the lower part 3 is increased, since the lower part 3 engages behind the connection unit 4 firmly connected to the upper part 2 due to soldering and thus produces an additional form-fit with the connection unit 4.

In all of the shown embodiments, a material from the polyamide group is used as thermoplastic plastic. Material of this class of materials behave basically in a manner similar to hotmelts, which are strongly set after cooling down to room temperature, however have good elastic characteristics at only very low conductance values, which is of particular advantage since the thermoplastic plastic also encloses the electrically active connection unit 4 in the form of the lower part 3.

In the embodiments shown in FIGS. 1, 2, 5 and 7, the lower part 3 fits essentially completely on the inside of the upper part 2, so that the upper part 2 and the lower part 3 can practically completely support one another, which works positively on the mechanical stability of the overall arrangement.

All shown transmitters have a lower part 3 that closes with the bottom edge 7 of the upper part 2. Such an arrangement is particularly advantageous in production, since they can be particularly easily positioned.

Furthermore, it can also be seen in all of the embodiments shown in FIGS. 1 to 7, that a feedthrough 8 is provided through the lower part 3 and through the upper part 2. In the embodiments according to FIGS. 1, 2 and 5, the feedthrough 8 is only formed in the upper part 2, wherein the feedthrough 8 is also partially formed in the lower part 3 in the embodiment according to FIG. 7. Regardless of how the feedthrough 8 is exactly designed, it is used essentially as a cable feedthrough for the connections of the sensor element, in order to lead the cables from the outside of the lower part 3 to the out-side of the upper part 2 and to connect to the contact elements 5 there. The feedthroughs 8 are all arranged centrally in the transmitters 1.

Figure 3:
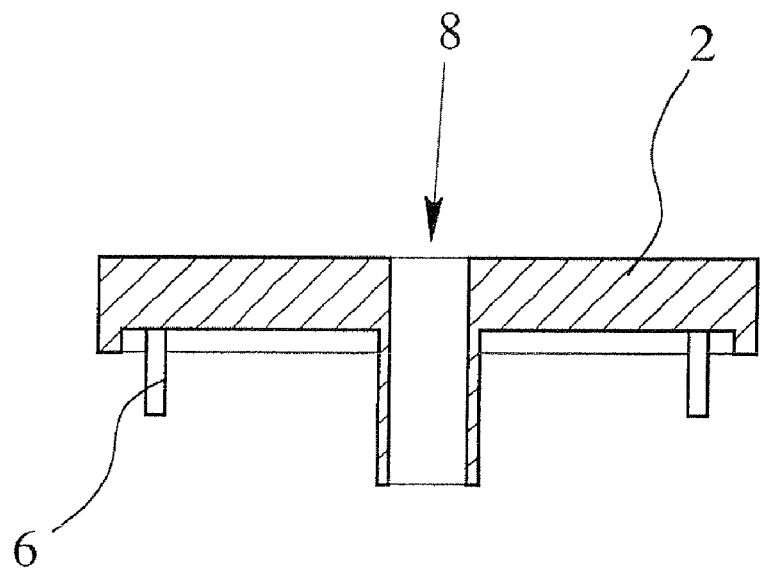
FIG. 3 is a schematic sectional view through a transmitter according to the invention, without a connection unit.
Figure 4:
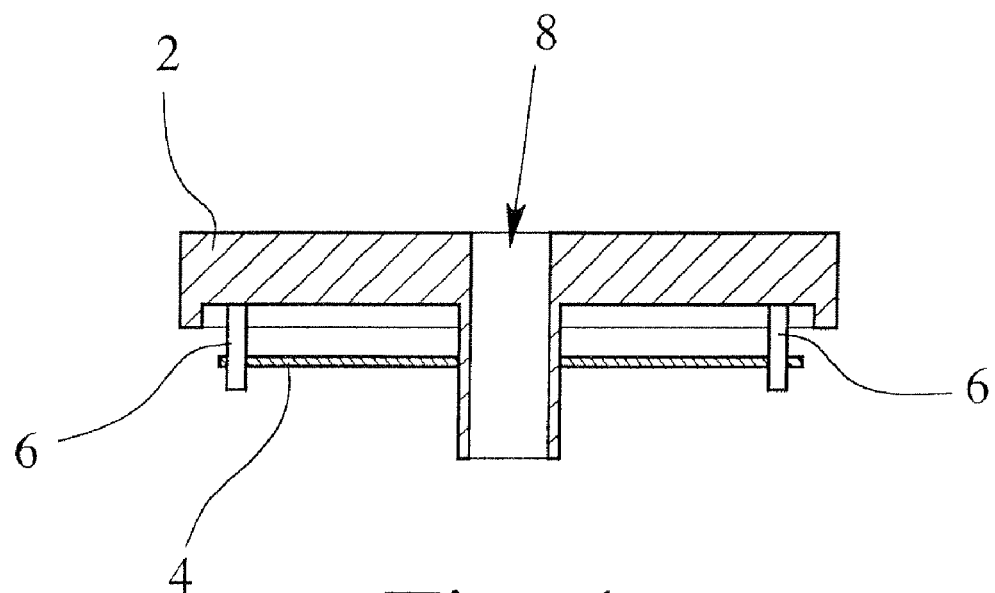
FIG. 4 is a schematic sectional view though a transmitter according to the invention, with a connection unit.
Figure 5:
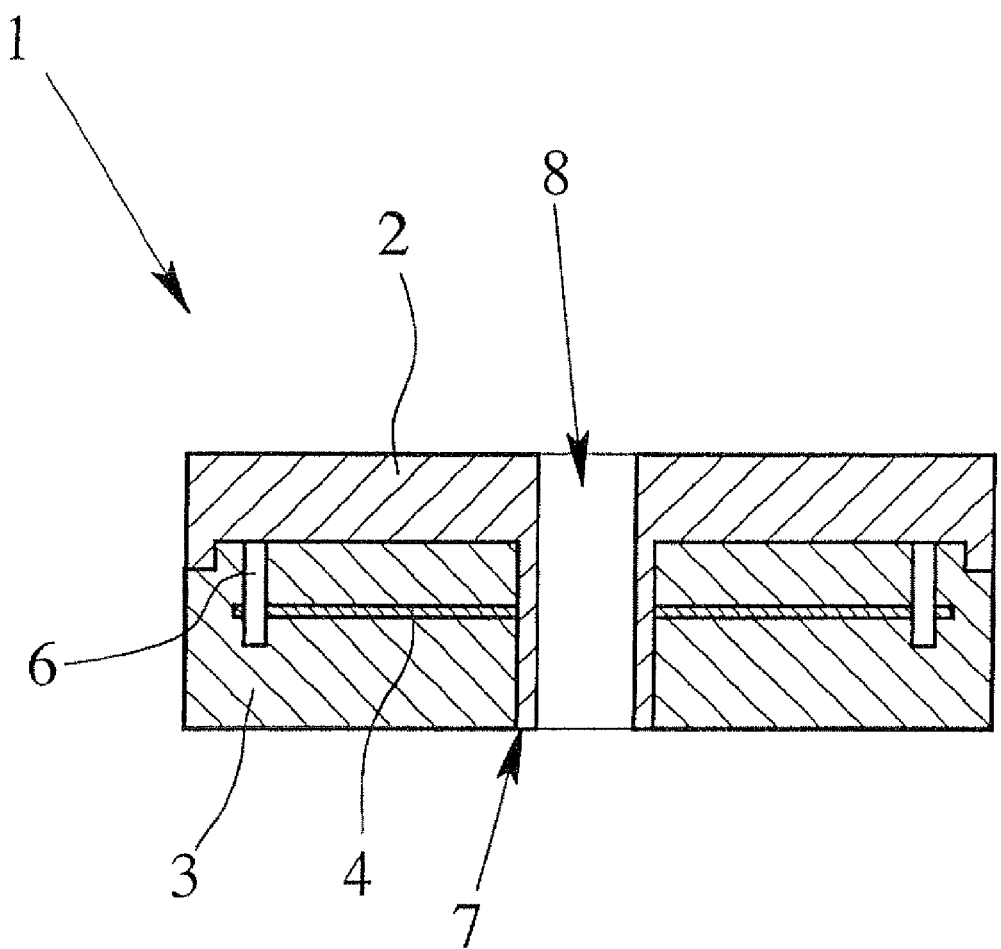
FIG. 5 is a schematic sectional view through a transmitter according to the invention, with an upper part and a lower part.

The production process of the transmitter 1 is schematically indicated in FIGS. 3 to 5. In FIG. 3, only the upper part 2 with contact pins 6 can first be seen, wherein a feedthrough 8 is formed in the upper part 2. The contact elements cannot be seen in this representation. How the upper part 2 is produced is of secondary importance for the method discussed here. For example, it could be a plastic or also ceramic mold; in the shown embodiment, the upper part 2 of the transmitter is of plastic.

In one of the method steps following the method step shown in FIG. 3, the electric connection unit 4 is arranged on the inside of the upper part 2 so that the connection unit 4 is electrically contacted via the contact element, which is shown in FIG. 4. In the case shown, the electric contact of the connection unit 4 occurs via the contact pins 6, which are not in electric contact to the contact elements that are not shown.

In one of the subsequent method steps, the upper part 2 is arranged in a form with the connection unit 4 and a thermoplastic plastic is heated to working temperature, i.e. heated to a point that so that it can be cast or, respectively, injected. In the present case, the thermoplastic plastic is a polyamide. The lower part 3 is integrally formed in the form not shown and on the inside of the upper part 2 by casting or injecting the thermoplastic plastic, so that the lower part 3 and the upper part 2 are force-fit or, respectively, form-fit with one another. A form fit is achieved, for example, in that the thermo-plastic plastic surrounds the elements of the upper part 2 found on the inside of the upper part 2 during the casting or injecting process. As the thermoplastic plastic cools, it contracts and securely encompasses these elements. The casting or, respectively, the injection process is designed in the embodiments shown so that the thermoplastic plastic —and, thus, the lower part 3—completely surrounds the connection unit 4, whereby an additional form fit is attained between the upper part 2 and the lower part 3 via the connection unit 4 that is securely attached to the upper part 2.

The casting or, respectively, injection process can be carried out very quickly and, in the cases shown, is completed in about 20 seconds. After the thermoplastic plastic is cooled, the produced transmitters can be calibrated; the vacuum and heat treatments known from the prior art are omitted.

Figure 6:
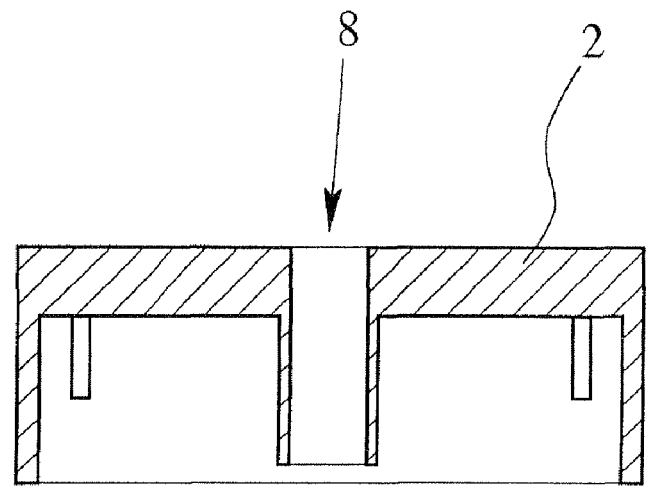
FIG. 6 is a schematic sectional view of a further embodiment of a transmitter, without a connection unit.
Figure 7:
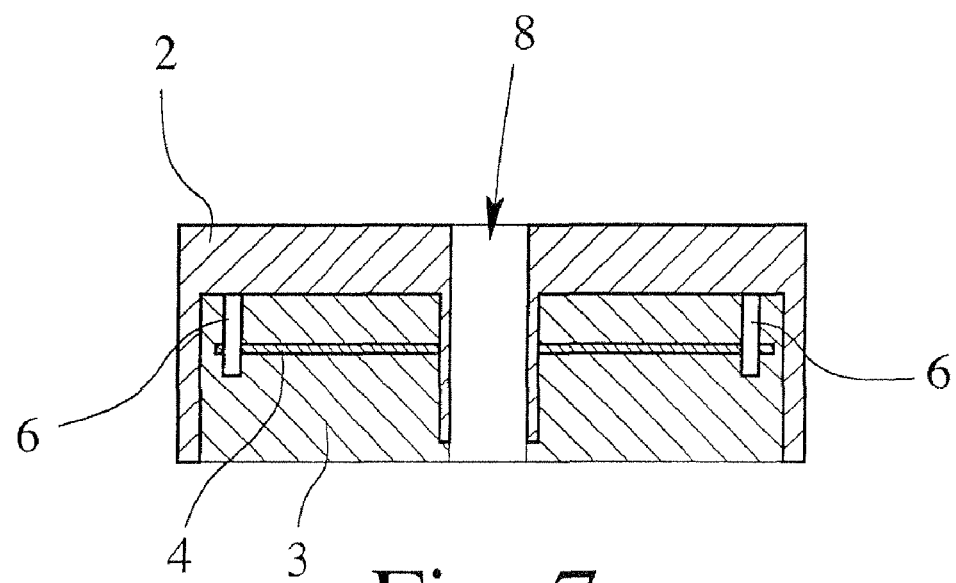
FIG. 7 is a schematic sectional view of a transmitter according to the invention based on the embodiment according to FIG. 6.

It is shown in FIGS. 6 and 7 that the lower part 3 not visible from the out-side has to project over the upper part 2, in fact, closes with the outer edge 7 projecting out the farthest. In this case, the lower part 3 is practically an inner part that is enclosed by the upper part 2 on its upper part and on the side.

The invention claimed is:

1. A transmitter for mounting in the head of a process thermometer, said transmitter having an upper part, a lower part, at least one circuit unit and at least one electric contact element, wherein the circuit unit is arranged on the inside of the upper part and can be electrically contacted via the contact element from the outside of the upper part and wherein the lower part is integrally formed using thermoplastic plastic and the upper part and the lower part are force-fit and/or form-fit with one another, wherein the lower part encloses the circuit unit arranged in the upper part, and wherein the lower part fits essentially completely on the inside of the upper part.

2. The transmitter according to claim 1, wherein the thermoplastic plastic is a material from the polyamides group or includes a material from the polyamides group.

3. The transmitter according to claim 1, wherein the lower part closes essentially even with the lower edge of the upper part.

4. The transmitter according to claim 1, wherein a feedthrough is provided through the lower part and the upper part, the feedthrough is formed in the upper part and the feedthrough is provided centrally in the transmitter.

5. The transmitter according to claim 1, wherein projections are formed in the upper part and corresponding projections are formed in the lower part, and wherein the projections of the upper part and the projections of the lower part support one another in the assembled state of the transmitter so that the upper part and the lower part are latched to one another.

6. A method for producing a transmitter wherein the transmitter has an upper part, a lower part, at least one circuit unit and at least one electric contact element, wherein the circuit unit is arranged on the inside of the upper part so that it is electrically contacted via the contact element from the outside of the upper part, said method comprising the steps of arranging the upper part in a form with the circuit unit, heating a thermoplastic plastic to working temperature and integrally forming the lower part by casting or injecting the thermoplastic plastic in the form and on the inside of the upper part, so that the lower part and the upper part are connected to one another with force fitting and/or form fitting.

7. The method according to claim 6, including the step of choosing as the thermoplastic plastic a material from the polyamides group or a material that includes polyamides.

8. The method according to claim 6, including the step of carrying out the casting or injection process in less than 30 seconds.

* * * * *

UNITED STATES PATENT AND TRADEMARK OFFICE
CERTIFICATE OF CORRECTION

| | | |
|---|---|---|
| PATENT NO. | : 8,128,284 B2 | Page 1 of 1 |
| APPLICATION NO. | : 12/271404 | |
| DATED | : March 6, 2012 | |
| INVENTOR(S) | : Hans-Owe Martensson | |

It is certified that error appears in the above-identified patent and that said Letters Patent is hereby corrected as shown below:

ON THE TITLE PAGE:

Please add the following Item (30) Foreign Application Priority Data

Nov. 14, 2007  (DE)  10 2007 054 717.1

Signed and Sealed this
Fifth Day of June, 2012

David J. Kappos
*Director of the United States Patent and Trademark Office*